United States Patent [19]
Tapella et al.

[11] Patent Number: 4,740,300
[45] Date of Patent: Apr. 26, 1988

[54] FILTER BED

[75] Inventors: Fernand Tapella, Esch-Sur-Alzette; Joseph Koster, Differdange, both of Luxembourg

[73] Assignee: Arbed S.A., Luxembourg, Luxembourg

[21] Appl. No.: 800,512

[22] Filed: Nov. 21, 1985

[30] Foreign Application Priority Data

Dec. 6, 1984 [LU] Luxembourg .............................. 85672

[51] Int. Cl.⁴ ............................................. B01D 23/16
[52] U.S. Cl. .................................... 210/282; 210/284; 210/290
[58] Field of Search ............... 210/264, 284, 289–291, 210/282

[56] References Cited

U.S. PATENT DOCUMENTS

| | | | |
|---|---|---|---|
| 651,173 | 6/1900 | Weaver | 210/264 |
| 3,134,735 | 5/1964 | Greenleaf | 210/264 |
| 3,178,024 | 4/1965 | Jacuzzi | 210/264 |
| 3,771,655 | 11/1973 | Hudson | 210/264 |
| 3,785,497 | 1/1974 | Giffard | 210/282 |
| 3,958,952 | 5/1976 | Van Ginneken | 210/282 |

*Primary Examiner*—Ivars Cintins
*Attorney, Agent, or Firm*—Fishman, Dionne & Cantor

[57] ABSTRACT

A filter bed for separating large quantities of water from granulated blast furnace slag consisting of layers of solid matter, preferably gravel, of various grain sizes is presented. The filter mass (solid matter) is in individual adjacent containers or housings preferably comprised of sheet steel which are closed on all sides and have removable covers. The covers, the bottoms of the containers and the sides of the containers are all perforated to permit filtrate passage. The perforated sheets comprising the covers are all individually replaceable.

24 Claims, 2 Drawing Sheets

FILTER BED

BACKGROUND OF THE INVENTION

This invention relates to a filter bed for use in conjunction with a granulation facility for blast furnace slag. More particularly, this invention relates to a new and improved filter bed wherein the layers of filtering material (gravel) are provided in individual containers preferably comprised of sheet metal (steel) which are closed on all sides and placed in abutting or adjacent relationship in the filter bed. These containers all include removable covers with the covers, bottoms of the containers and sides of the containers all being perforated.

It is well known that during the processing (granulation) of blast furnace slag, the molten slag material is passed through a filter bed for removal of impurities from the slag. The core section of such a filter bed is comprised of a plurality of filter layers which are formed by pouring several layers of solid matter, preferably sand, on top of one another. Typically, three or more grain sizes of sand are used in the filter bed with the lower most layer consisting of the group of largest grain size and the upper most layer consisting of the group of smallest grain size. Thus, for example, an upper sand layer may have a grain size of between about 4–8 mm, with middle layers having sand with grain sizes of between about 8–16 mm and the lowest layer of sand having a grain size of between about 16–25 mm.

Significantly, this layered arrangement of varyingly sized grains of sand is used in the actual operation of a filter bed as much as possible. This is because the lower layer of sand contains finely perforated pipes embedded therein which serve to carry off the filtrate (liquid). These finely perforated pipes have a tendency to clog or stop up due to insufficient filtering whereby fine grain sand and other particles travel to the lower layers from the upper layers and clog up the perforated pipe. In order to maintain the effectiveness of the filtering layer on a continuous basis, and also in order not to obstruct the perforated drain pipes, the impurities (that is, the fine slag and sand particles) are removed from the layers of sand by the use of compressed air being blown therethrough. This compressed air is blown through the built up filter layers in a periodically repeating cycle using a reverse current. Unfortunately, this compressed air current can disturb the desired multilayer arrangement; and can also be unsuccessful in removing the fine impurities from the layers of sand. If this purification measure i.e., the use of compressed air, fails the only alternative is to remove the entire sand mass from the filter bed and lay down new layers of sand with new drain pipes.

The laying down of a new filter bed as discussed above is a protracted process and requires care and skill, particularly in the pouring of the sand layers of different grain sizes on top of each other. It will be appreciated that formation of a new filter bed is especially undesirable if the new filter bed has to be prepared during the filtration and granulation operation itself. Thus, if one has to interrupt the entire operation and prepare a new filter bed due to problems such as pipe blockages or erosions which appear in certain filter bed zones, the result is both expensive and labor intensive. Moreover, during peak periods, operators are often forced to repair the filter bed in a prophylactic manner, since the above described problems with the filter beds typically arise suddenly during use; while the repair thereof often takes weeks.

SUMMARY OF THE INVENTION

The above described and other problems and deficiencies of the prior art are overcome of alleviated by the improved filter bed for use in a granulation facility for glass furnace slag of the present invention. In accordance with the present invention, the concept of filter beds as is presently applied in large scale facilities (as discussed in detail above) is altered whereby a rapid and problem free manner of repairing damaged filter beds is accomplished without having to remove or completely rebuild the entire filter bed as is now required in the present state of the art. In accordance with the present invention, filter material (sand) of different grain sizes is layered on top of one another and placed in individual boxes or containers (preferably steel) which are set out in adjacent relationship. These containers are closed on all sides and include removable covers. Significantly, the covers, the container floors and the container side walls are all perforated to permit the passage of filtrate therethrough.

The features and advantages of the novel filter bed in accordance with the present invention is that during repair of "local" problems (i.e., a blocked or clogged up pipe or damaged sand layer), the operators must shut down the granulation facility for only a short time in order to remove the particular container wherein the local problem is present. It will be appreciated that suitable filter beds can be easily prepared in reserve boxes or containers which can then be rapidly interchanged with a damaged box in a virtually problem free manner. Moreover, the present invention also permits the testing of new filter materials during operation without having to fear greater drawbacks in the case of deficient functioning, since, if desired, the filter container may be removed and exchanged in a short amount of time.

The above discussed and other features and advantages of the present invention will be apparent to and understood by those skilled in the art from the following detailed description and drawings.

BRIEF DESCRIPTION OF THE DRAWINGS

Referring now to the drawings, wherein like elements are numbered alike in the several FIGURES.

DESCRIPTION OF THE PREFERRED EMBODIMENTS

Figure 1:
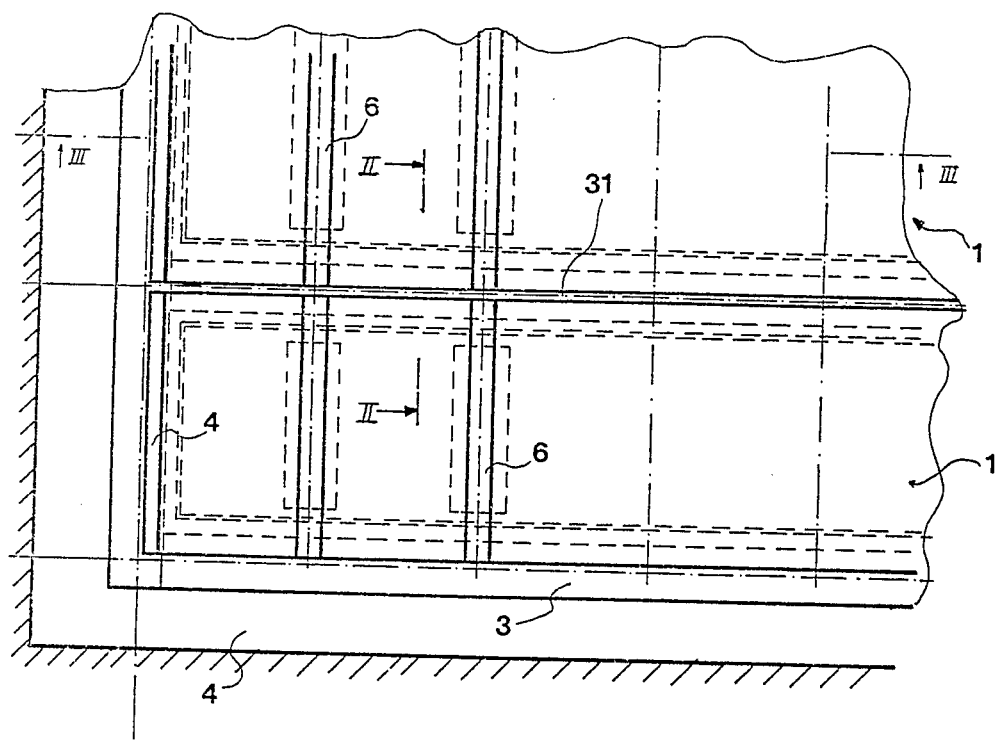
FIG. 1 is a plan view of portion of a filter bed prepared in accordance with the present invention.

Referring first to FIG. 1, a portion of two boxes or containers are shown generally at 1 of a filter bed which is divided into ten boxes (eight of which are not shown). The boxes or housings 1 are arranged in several rows and may be either of different sizes or they may have essentially identical dimensions. Containers 1 rest on their sides supported by longitudinal beams 2 and transverse beams 3 and 31 (see also FIGS. 2 and 3). Beams 2, 3, and 31 (typically "I" beams) may rest on the side walls 4 of the filter bed as well as on intermediate walls 5. Transverse beams 31 rest or are supported with their two ends on side wall 4 and intermediate wall 5. If large-size containers or housings 1 are being used, then it would be advisable to use concrete supports so as to prevent undue bending of transverse beams 31.

Figure 3:
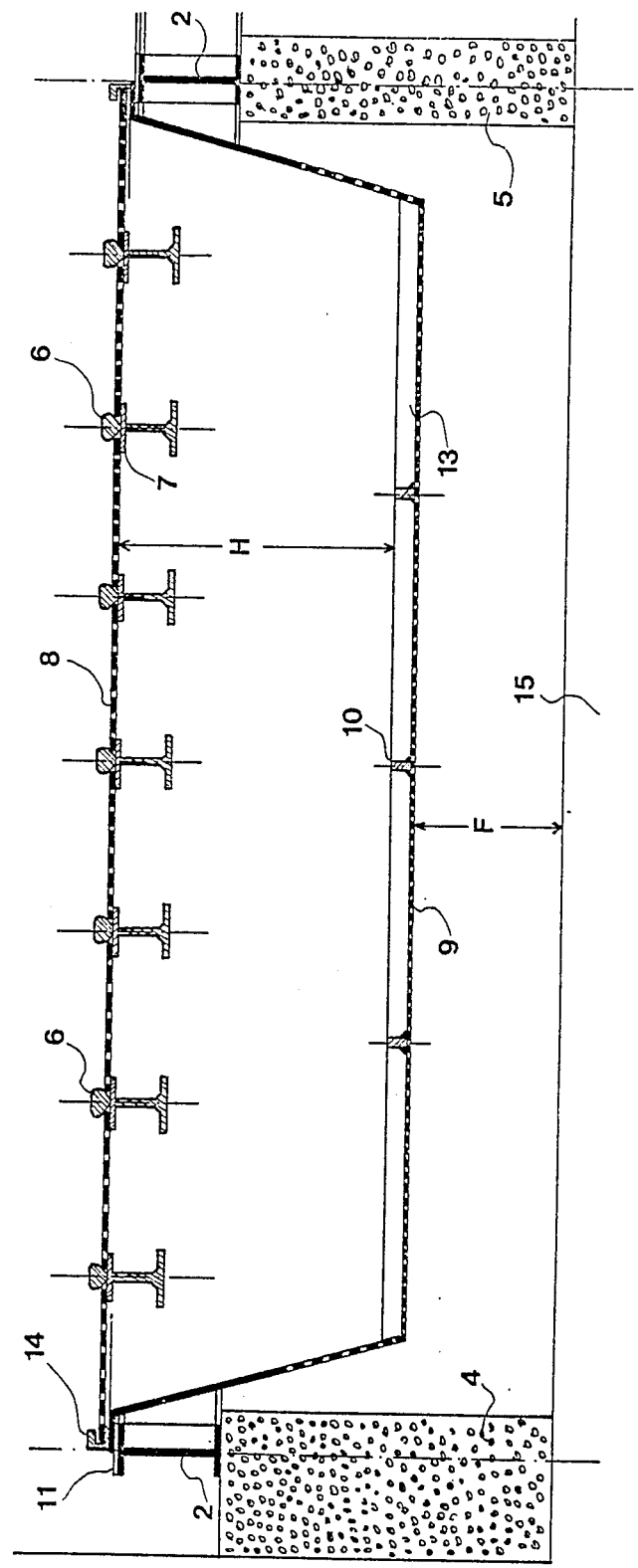
FIG. 3 is a cross sectional elevation view along the line 3—3 of FIG. 1.

As is shown in FIG. 3, housings 1 have on the upper surfaces thereof parallel elongated members or rails 6. Parallel rails 6, in turn, are equipped at the lower surface thereof with flat steel 7. Containers 1 include covers which consist of a plurality of preferably square perforated metal sheets 8. These sheets 8 are provided between the flat steel 7 and the rail heads and can be individually exchanged. On both sides of each container where there are no rails, metal sheets 8 are retained by U-shaped steel pieces 14. Rails 6 are supported at each opposed ends by transverse beams 3. Aside from the support of the metal sheets, rails 6 prevent sheets 8 from being damaged when the granulated blast furnace slag is picked up by a crane with slotted or perforated clam and either brought to a storage silo or immediately loaded.

As was mentioned above, the filter bed must be periodically cleaned and loosened up with compressed air. As a result, containers 1 must rest air-tight on the beams on all sides. To provide such an air-tight seal, intermediate layers 11 of an elastomeric material (e.g. rubber) are provided and cemented or otherwise applied onto the beam flange.

Container or housing floor 9 is comprised of perforated metal sheets which are reinforced by an open-meshed grating preferably made of flat steel 10 and 13. In the embodiment of the present invention shown in FIG. 3, the height H of a box 1 was 0.7 meters (m), while the clearance F between box floor 9 and concrete floor 15 of the granulating facility was about 0.4 m. Preferably, the height H between box cover and floor does not exceed 1 meter. The length and width measurements of box 1 are typically in the range of between about 2 to about 6 meters. Smaller boxes may be more expensive to produce, but they also allow a more cost-effective replacement to the filtering material.

Figure 2:
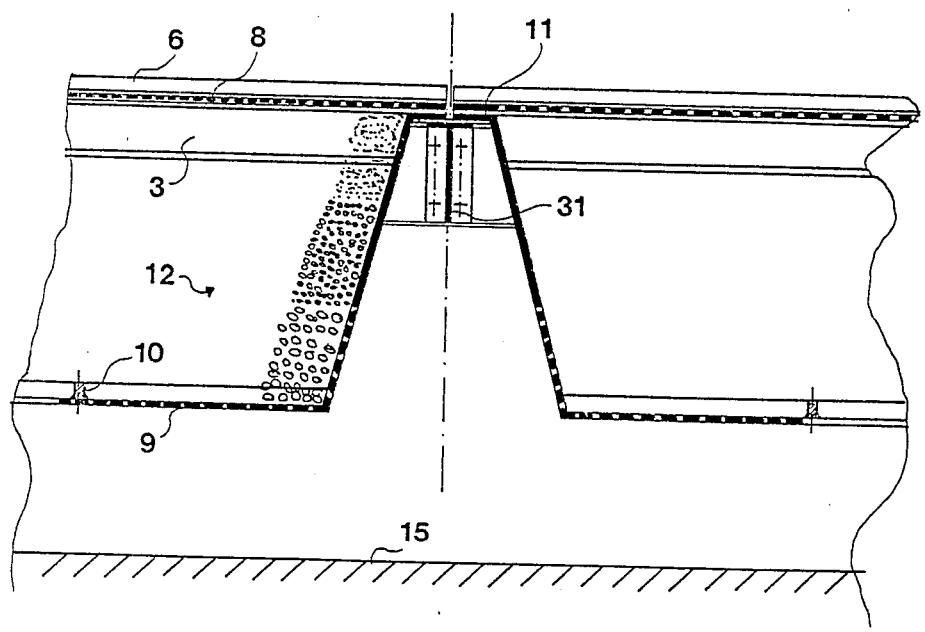
FIG. 2 is a cross sectional elevation view along the line 2—2 of FIG. 1.

The various sand layers 12 are schematically indicated on the containers side in FIG. 2. As can be seen in FIG. 2, the lowermost sand layer has the largest grains with the grains getting smaller toward the uppermost layer. Preferably, the uppermost sand layer terminates just below perforated sheets 8 so as to preclude undesirable bending of the sheets 9.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. A filter bed for the separation of water from granulated blast furnace slag using a solid filter material, the filter bed comprising:
   a plurality of removable and interchangeable adjacent containers, each container having granular solid filter material therein, each container including;
   four sidewalls;
   a bottom; and
   a cover, said bottom and cover being spaced apart by said four sidewalls;
   said four sidewalls, bottom and cover comprised of metal sheet having a plurality of openings therethrough defining perforations to permit filtrate to pass through said perforations; and
   said granular solid filter material being layered in each of said containers, the layer nearest the container bottom having the largest granules with the granules in each successive layer becoming progressively smaller toward said container cover.

2. The filter bed of claim 1 wherein:
said cover is removable from said container.

3. The filter bed of claim 1 wherein:
said granular solid filter material comprises sand.

4. The filter bed of claim 1 wherein:
said containers are comprised of steel.

5. The filter bed of claim 1 wherein each of said covers comprise:
a plurality of interchangeable perforated sheets.

6. The filter bed of claim 5 including:
elongated members positioned between each sheet, said elongated member including supporting means associated therewith whereby said sheets are supported between said elongated members and said supporting means.

7. The filter bed of claim 1 including:
beams supporting said container sidewalls.

8. The filter bed of claim 7 wherein:
said beams are "I" beams.

9. The filter bed of claim 7 including:
elastomeric material positioned between said container sidewalls and said supporting beams.

10. The filter bed of claim 7 including:
concrete supports, said supporting beams resting on said concrete supports.

11. The filter bed of claim 1 wherein said container bottom includes:
reinforcing means, said reinforcing means comprising open meshed grating.

12. The filter bed of claim 1 wherein:
the distance between said container cover and bottom does not exceed 1 meter.

13. A filter bed for the separation of water from granulated blast furnace slag using a solid filter material, the filter bed comprising:
   a plurality of removable and interchangeable adjacent containers, each container having granular solid filter material therein, each container including;
   four sidewalls;
   a bottom; and
   a cover comprising a plurality of interchangeable perforated sheets, said bottom and cover being spaced apart by said four sidewalls;
   said four sidewalls, bottom and cover comprised of metal sheet having a plurality of openings therethrough defining perforations to permit filtrate to pass through said perforations; and
   elongated members positioned between each of said plurality of interchangeable perforated cover sheets, said elongated members including supporting means associated therewith whereby said cover sheets are supported between said elongated members and said supporting means.

14. The filter bed of claim 13 wherein:
said cover is removable from said container.

15. The filter bed of claim 13 wherein:
said granular solid filter material comprises sand.

16. The filter bed of claim 15 wherein:
said granular solid filter material is layered in each of said containers, the layer nearest the container bottom having the largest granules of sand with the granules in each successive sand layer becoming progressively smaller toward said container cover.

17. The filter bed of claim 13 wherein:
said granular solid filter material is layered in each of said containers, the layer nearest the container bottom having the largest granules with the granules in each successive layer becoming progressively smaller toward said container cover.

18. The filter bed of claim 13 wherein:
said containers are comprised of steel.

19. The filter bed of claim 13 including:
beams supporting said container sidewalls.

20. The filter bed of claim 19 wherein:
said beams are "I" beams.

21. The filter bed of claim 19 including:
elastomeric material positioned between said container sidewalls and said supporting beams.

22. The filter bed of claim 19 including:
concrete supports, said supporting beams resting on said concrete supports.

23. The filter bed of claim 13 wherein said container bottom includes:
reinforcing means, said reinforcing means comprising open meshed grating.

24. The filter bed of claim 13 wherein:
the distance between said container cover and bottom does not exceed 1 meter.

* * * * *